M. F. WICKERSHAM.
Dumping Cart.

No. 95,176. Patented Sept. 21, 1869.

Witnesses:

Inventor:
M. F. Wickersham

United States Patent Office.

M. F. WICKERSHAM, OF SPRINGFIELD, ILLINOIS, ASSIGNOR TO HIMSELF, THOMAS ECKARDT, H. F. ELDRED, J. G. LAW, T. HUTCHINSON, C. B. HURD, C. DRESSER, AND D. SHERMAN.

Letters Patent No. 95,176, dated September 21, 1869.

IMPROVED DUMPING-CART.

The Schedule referred to in these Letters Patent and making part of the same.

*To all whom it may concern:*

Be it known that I, M. F. WICKERSHAM, of Springfield, in the county of Sangamon, and State of Illinois, have invented a new and useful Improved Dumping-Cart; and I do hereby declare the following to be a full, clear, and exact description thereof, which enable others skilled in the art to which my invention appertains, to make and use the same, reference being had to the accompanying drawings, forming part of this specification, in which—

Similar letters of reference indicate corresponding parts in the several figures of the drawings.

Figure 1:
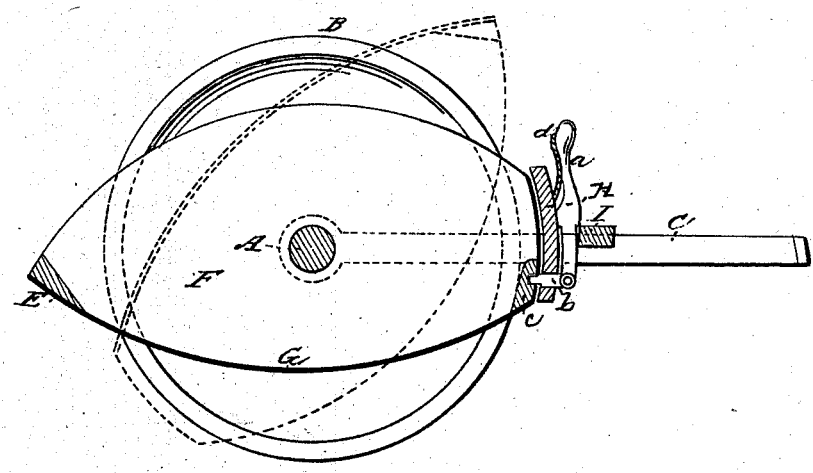
Figure 1 is a longitudinal section of my improved dumping-cart, taken in the plane of the line $xx$, fig. 2.
Figure 2:
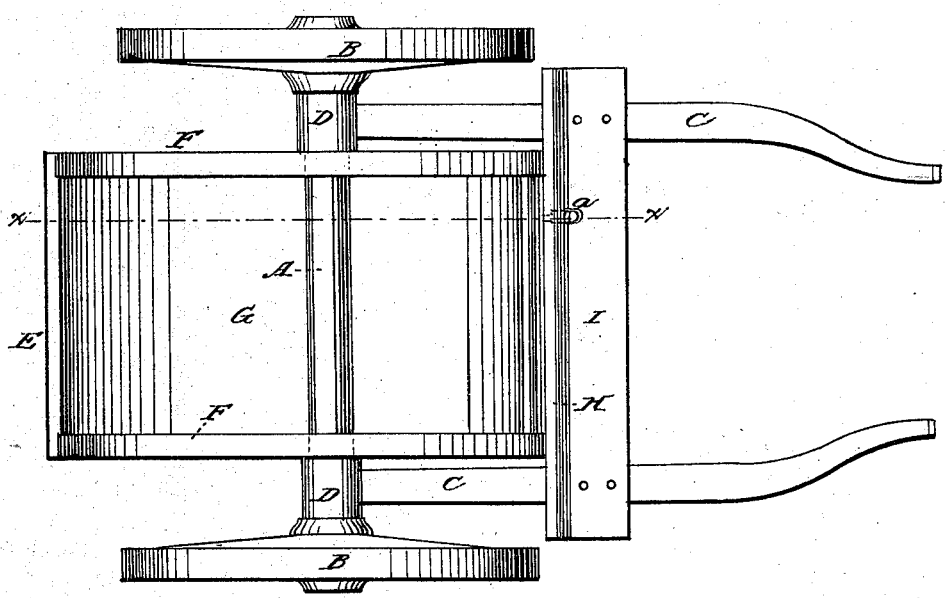
Figure 2 is a top plan view of the same.

My invention has for its object to improve the construction of the dumping-cart for which application for Letters Patent of the United States was made by me, August 7, 1869.

It is designed more especially for use with street-sweeping machines, but is equally applicable to all purposes for which dumping-carts are usually employed.

In said application for Letters Patent, the body of the cart is hung upon the axle in such a manner that the inner ends of the thills are within said body. This construction is objectionable, from the fact that the capacity of the cart is materially decreased by the space occupied by the thills. It is, moreover, so arranged that it can be dumped at the front end only.

My present invention consists in hanging the body of the cart upon the axle between the thills, whereby it is adapted to be dumped at either the front or rear end, and its capacity considerably increased.

In the accompanying drawings—

A is the axle, and

B, the wheels of a dumping-cart as usually constructed.

C are the thills, the inner ends of which are secured to the axle in any suitable manner. In this example of my invention, they are attached to a collar, D, fastened to the axle near its ends, as shown. These collars form shoulders at their outer ends, against which the hubs of the wheels bear, and at their inner or proximate ends, against which the sides of the cart-body are placed.

E is the cart-body, whose sides F are somewhat elliptical in form, and are hung centrally upon the axle A, as shown in the drawings.

The bottom G of the cart is curved, as shown, and formed of sheet-metal or other suitable material.

The body E is so nearly balanced upon the axle that it can be dumped either forward or backward, as circumstances may require.

H is a board or strip of wood, placed edgewise upon the thills, transversely of the same, as shown in fig. 1. It is slightly curved transversely, and forms the front end of the cart-body, when the latter is in position for use.

I is a cross-bar connecting the two thills, as shown.

The body E is locked to the strip H by means of a spring-catch, which, when released, permits the cart to be dumped either forward or backward. This catch is formed of a short lever, $a$, extending vertically through the cross-bar I, within reach of the driver. It is pivoted at its lower end to a pin, $b$, passing through the strip H, and entering a recess or hole formed in the transverse bar $c$, which connects the forward ends of the side-pieces F.

$d$ is a spring at the upper end of the lever, by which the pin is held within the recess in the bar $c$.

When it is desired to dump the cart, the pin $b$ is withdrawn from the recess, by pressing the lever against the tension of the spring, as will be easily understood.

By my improvement, the cart-body can be dumped either at the forward or rear end. When used with a street-sweeping machine, it is desirable to dump it forward, but when employed in the construction of railroads, it is necessary that it be dumped at the rear end.

If desired, that portion of the axle A within the cart-body may be bent or curved upward, to still further increase the capacity of the cart.

Having thus described my invention,

What I claim as new, and desire to secure by Letters Patent, is—

The body of a dumping-cart, hung upon the axle in such a manner as to be dumped at either end, and arranged substantially as herein shown and described, for the purpose specified.

The above specification signed by me, this 21st day of August, 1869.

M. F. WICKERSHAM.

Witnesses:
S. C. FIELD,
JOHN A. SILENCE.